Sept 17, 1957 C. SCHULTZ 2,806,484
AUTOMATIC SAFETY FLOW CONTROL VALVE
Filed Dec. 27, 1951
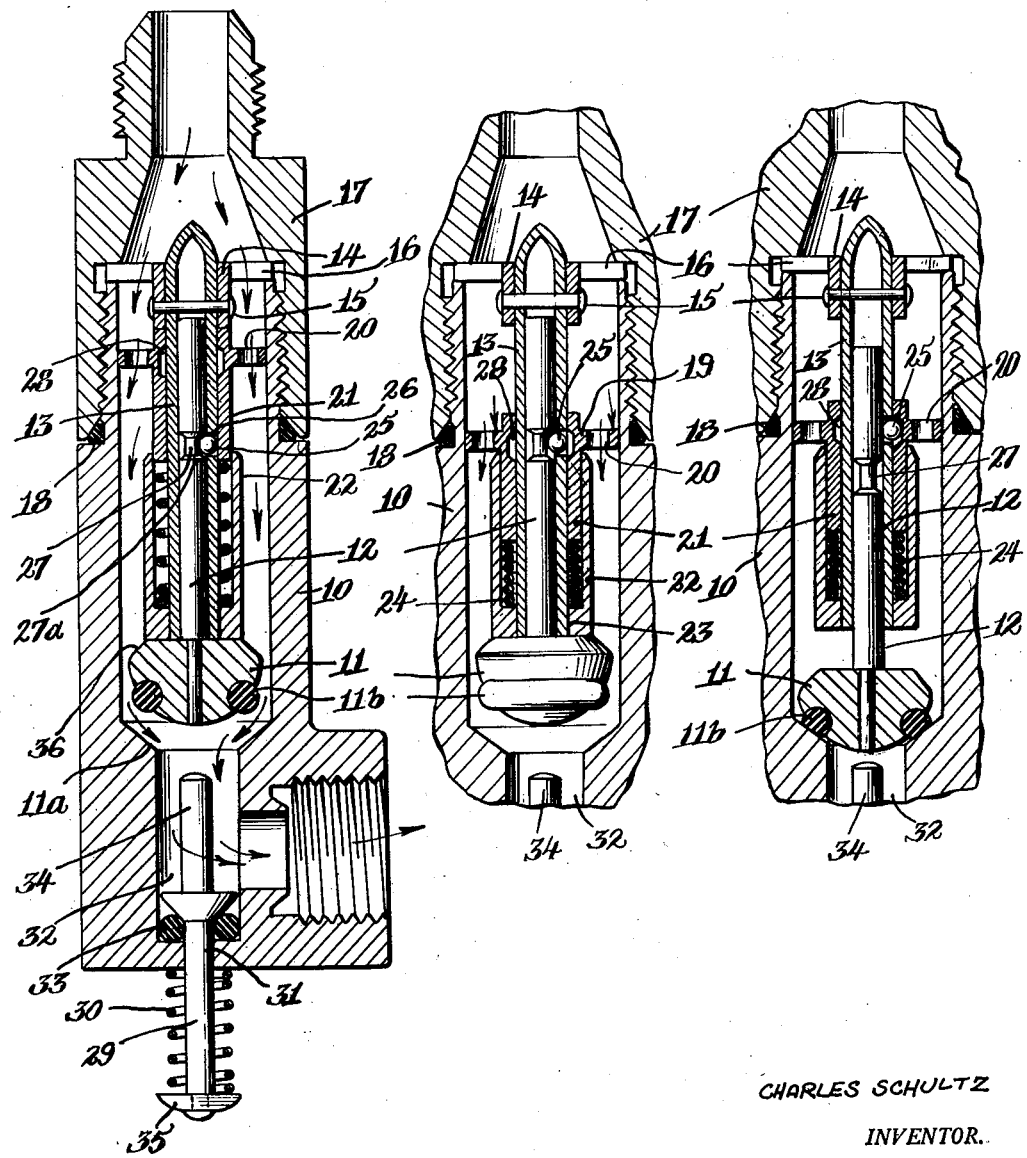
CHARLES SCHULTZ
INVENTOR.
BY
ATTORNEY

United States Patent Office 2,806,484
Patented Sept. 17, 1957

2,806,484

AUTOMATIC SAFETY FLOW CONTROL VALVE

Charles Schultz, Lindenhurst, N. Y.

Application December 27, 1951, Serial No. 263,579

1 Claim. (Cl. 137—460)

This invention relates generally to an automatic safety flow-control valve, but more specifically to a device for automatically cutting off flow of gases and fluids under predetermined conditions.

The main object of the invention resides in the provision of a simple cut-off valve having its parts aligned for concentric reciprocation axially of the flow, and having a latching device to lock the valve in open position under normal conditions and to release the valve for locked closure of the line under abnormal predetermined conditions such as are caused by a break or blocking in steam, gas and fluid lines.

A further object of the invention resides in the provision of an automatic cut-off device wherein operation depends on a predetermined abnormal gas or fluid pressure exerted upon a normally spring-balanced pressure disc. Said disc under said abnormal pressure is adapted to trip a latching device which releases and locks the cut-off valve in closed position.

Another object of the invention resides in the provision of an automatic cut-off valve which comprises a minimum of parts which are simple and efficient in structure and operation and which are adaptable for various conditions of pressure and for various gases and fluids of different densities and viscosities.

These objects and other ends and advantages of the invention will hereinafter appear in the progress of the disclosure and as pointed out in the appended claim.

Accompanying this specification are drawings showing preferred forms of the invention and wherein:

Figure 1 is a longitudinal view in section of the cut-off valve showing the direction of movement of the fluid or gas therethrough in normal open position.

Figure 2 is a similar view partly in section and partly cut-away indicating a depressed position of the flow control disc under abnormal pressure conditions preceding release of the cut-off valve.

Figure 3 is a view of the device similar to Figure 2 indicating cut-off position.

In accordance with the invention and the preferred embodiments shown, the device of Figures 1–3 embraces a main valve housing member 10 having therewithin a valve head 11 adapted to overlie a valve housing member opening 11a, the said valve head being provided with a conventional sealing ring 11b.

A valve rod or stem 12 is provided to be reciprocable within a fixed central and concentric or first tube 13 within the valve housing member 10. Tube 13 has an anchoring sleeve 14 secured by a rivet 15 therethrough and further has ears 16 fixedly secured between the upper end of the main valve housing member 10 and a portion of the upper valve housing member 17. The valve housing members 10 and 17 are threadedly engaged with a sealing ring 18 therebetween.

Valve rod 12 is normally latched against axial movement within the fixed central tube 13 until a predetermined pressure of fluid or gas passes through the valve housing members. When the critical pressure is reached, the latching mechanism releases valve rod 12 thereby allowing said pressure to force valve head 11 to closing position over opening 11a to effectuate an automatic cut-off. The latching mechanism in valve rod releasing position further serves to lock a normally spring balanced pressure plate, and for further operation after the cut-off, the device requires a manual resetting as will hereinafter appear.

The latching device for valve rod 12 as shown in the embodiment of the invention of Figures 1, 2 and 3 is controlled by a pressure disc or flow responsive plate 19 having perforations 20 therein, said disc at the inner diameter reciprocating about the outer wall of the fixed, central concentric tube 13 and at the outer diameter reciprocating on the inner wall of cylindrical main valve housing 10. Pressure disc 19 is further provided with a sleeve 21 slightly extending thereabove and depending therebelow, said sleeve 21 reciprocating internally on the outer wall of fixed tube 13 and externally on the inner wall of concentric socket member or second tube 22. Socket member 22 is fixed to the lower end of central tube 13 and permits penetration therethrough of valve rod 12 as seen in Figure 3.

The bottom wall of socket 22 centrally perforated as at 23 serves as a base or an internally-extending shoulder for a coiled tension spring 24, the upper end thereof bearing against the bottom edge of the lower pressure disc sleeve 21 for purposes of normally resisting downward motion thereof, the upper pressure disc sleeve 21 abutting against the bottom edge of anchoring sleeve 14 as an upper limiting stop.

The latching device for both valve rod 12 and pressure disc 19 is shown in the form of a ball in the embodiment of the invention shown in Figures 1, 2 and 3, said ball being indicated by numeral 25 and normally sits in place between an opening or hole 26 in the fixed central tube 13 and a reduced portion 27 in the rod 12. The end walls of reduced portion 27 are tapered as in a spool formation, said end walls being indicated by numeral 27a. Thus, when ball 25 is positioned between opening 26 and reduced portion 27 of valve rod 12, the latter is locked in place and is prevented from moving.

At the same time sleeve disc 21 is free to reciprocate when acted upon by the pressure of the fluid or gas flow thereagainst in the direction of the down-pointed arrows as shown in Figures 1, 2 and 3, against the resistance of the normally balancing spring 24. When the resistance of spring 24 is overcome at a predetermined critical value of pressure against perforated disc 19 as shown in Figures 2 and 3, the pressure disc attains its maximum low position as indicated by full compression of spring 24. At this time, ball 25 is thrust into an inner peripheral groove 28 at the inner diameter of pressure disc 19, said thrust being effectuated by the upper conical wall 27a of the reduced portion 27 of the valve rod 12. When this occurs, valve rod 12 is released as shown in Figure 3 and the pressure against valve head 11 at upper deflecting edge 36 causes the latter to drop in cut-off position over housing opening 11a. In cut-off position of valve head 11, the pressure disc 19 is locked in place by ball 25 settling in the opening 26 of fixed tube 13 and the pressure disc inner groove 28. It is understood that more than one ball as 25 and more openings as 26 in tube 13 may be used.

After closure of valve housing opening 11a, the valve has to be manually reset for further operation to permit the pressure disc to function against the full normal resistance of spring 24, and for this purpose a conventional resetting assembly is provided axially of the valve assembly. As shown in Figures 1, 2 and 3 the resetting assembly has an external push rod 29 penetrating main valve housing member 10 and is maintained in outer position by a tension coil spring 30. Rod 29 penetrates valve housing 10 as at 31 and passes through an enlarged axial bore 32 having a sealing ring 33 at the bottom thereof. The inner end of rod 29 indicated by numeral 34 is adapted to be thrust against valve head 11 upon inner movement of external rod head 35 against pressure of spring 30 so that valve rod 12 is elevated to a point where ball 25 drops into the reduced portion 27 thereof, said position being indicated and shown in Figure 1. Thereafter the resetting rod head 35 is released.

When the cut-off device above described is situated in a position where valve head 11 moves against the action of gravity, a tension spring may be provided as shown by numeral 35 in Figure 4, which has a value equal to the weight of the valve head 11 and valve rod 12. Upon sufficient pressure being exerted on pressure disc 19 to overcome the force of spring 24, valve head 11 closes without further flow pressure. However, even in the absence of tension spring the flow reaching a predetermined pressure will continue to impinge on the aforementioned deflecting angle 36 of valve head 11 shown in Figures 1, 2 and 3 and close the same for cut-off position.

The material of the automatic cut-off device described is made of suitable material to fit requirements. Brass is used for steam; lead could be used for acids inert thereto and other materials inert to composition of the flow elements could be used.

The tension of the springs described herein, the size of the pressure disc, the number and size of perforations therein, the material and strength of the parts are proportioned in accordance with volume, velocity, density, viscosity and composition of the flow material.

I wish it understood that minor changes and variations in the integration, material, location and size of parts may be varied as coming within the field of the invention and the scope of the appended claim.

I claim:

In an automatic cut-off device for a fluid line comprising, in combination, a valve housing, a valve stem having a reduced diameter portion intermediate the length thereof, a valve attached to the stem and axially movable therewith, said stem having a latch associated therewith for maintaining said valve normally in the open position, said latch including a ball carried in said reduced diameter portion, said stem and valve being movable by fluid flow through said housing to close a passage therein, a first tube mounted in said housing, said first tube being closed at its end opposite the valve, means fixing said end to the wall of said housing, said valve stem being axially movable in said first tube, said first tube having a hole for retaining the ball against movement longitudinally of the stem while allowing lateral displacement thereof, a perforated flow responsive plate with a central depending sleeve surrounding said first tube and being slidable thereon, said sleeve having a groove therein to receive the ball when the sleeve has been moved to a position wherein the groove is in lateral alignment with said opening, said tube projecting in the direction of fluid flow and having a surface at its other end providing an abutment for said valve in its open position, a second tube which is secured in spaced concentric relationship to the first tube by an internally extending shoulder which is secured to said other end of the first tube so as to form an enclosed chamber, one end of said sleeve being slidable in the space between said tubes to form an end of said chamber, a spring surrounding the first tube and located in said chamber, said spring being held in compression between said shoulder and said one end of the sleeve to normally bias the plate in a direction opposite to the fluid flow, said plate being movable upon a predetermined fluid flow in the direction of the fluid flow so that the groove in said sleeve will become aligned with said opening to allow said ball to move out of said reduced diameter portion into said groove and thus release the valve so that it may be moved to its closed position by fluid flow, and means for resetting the valve to its normally open position.

References Cited in the file of this patent

UNITED STATES PATENTS

| | | |
|---|---|---|
| 598,935 | Jewell | Feb. 15, 1898 |
| 635,828 | Weston et al. | Oct. 31, 1899 |
| 1,093,899 | Waddell | Apr. 21, 1914 |
| 1,155,915 | Grove | Oct. 5, 1915 |
| 1,526,512 | Teten | Feb. 17, 1925 |
| 2,198,487 | Sisk | Apr. 23, 1940 |
| 2,351,035 | Grant | June 13, 1944 |
| 2,447,546 | Spencer | Aug. 24, 1948 |
| 2,515,516 | Kalen | July 18, 1950 |

FOREIGN PATENTS

| | | |
|---|---|---|
| 130,264 | Germany | Apr. 23, 1902 |